US007458529B2

(12) United States Patent
Ricco et al.

(10) Patent No.: US 7,458,529 B2
(45) Date of Patent: Dec. 2, 2008

(54) ADJUSTABLE METERING SERVOVALVE FOR A FUEL INJECTOR

(75) Inventors: Mario Ricco, Casamassima (IT); Adriano Gorgoglione, Valenzano (IT); Sisto Luigi De Matthaeis, Valenzano (IT)

(73) Assignee: C.R.F. Societa Consortile per Azioni (IT)

( * ) Notice: Subject to any disclaimer, the term of this patent is extended or adjusted under 35 U.S.C. 154(b) by 166 days.

(21) Appl. No.: 11/356,638

(22) Filed: Feb. 17, 2006

(65) Prior Publication Data

US 2006/0202144 A1 Sep. 14, 2006

(30) Foreign Application Priority Data

Mar. 14, 2005 (EP) ................................ 05425151
Nov. 9, 2005 (EP) ................................ 05110564

(51) Int. Cl.
*F16K 31/02* (2006.01)

(52) U.S. Cl. ............................ 239/585.3; 251/129.16; 251/129.18

(58) Field of Classification Search ............ 251/129.16, 251/129.18; 239/585.3, 585.1
See application file for complete search history.

(56) References Cited

U.S. PATENT DOCUMENTS 3,211,172 A * 10/1965 Parkison ..................... 251/262
3,299,504 A * 1/1967 Hopp ......................... 277/630
4,482,094 A 11/1984 Knape et al.
4,767,097 A * 8/1988 Everett et al. .......... 251/129.08
4,832,314 A * 5/1989 Trott ....................... 239/585.3
5,082,180 A 1/1992 Kubo et al.
5,312,050 A * 5/1994 Schumann et al. ....... 239/585.1
5,467,963 A * 11/1995 Crofts et al. ........... 251/129.18
5,582,153 A * 12/1996 Dutt et al. ............. 251/129.16
6,126,094 A * 10/2000 Ricco .................... 251/129.16
6,131,829 A * 10/2000 Ricco .................... 251/129.16
6,152,387 A * 11/2000 Ricco ...................... 239/585.1
6,202,936 B1 * 3/2001 Frick ....................... 239/585.1
6,443,132 B1 * 9/2002 Ricco et al. ............. 239/585.3
6,601,784 B2 * 8/2003 Muller-Girard et al. .. 239/585.1
7,156,368 B2 * 1/2007 Lucas et al. ............ 251/129.19

FOREIGN PATENT DOCUMENTS

EP 0 890 730 A 1/1999
EP 0 916 843 A 5/1999
GB 2 378 985 2/2003

OTHER PUBLICATIONS

European Search Report EP 05 42 5151 dated Jul. 28, 2005.

* cited by examiner

*Primary Examiner*—John Bastianelli
(74) *Attorney, Agent, or Firm*—Ostrolenk, Faber, Gerb & Soffen, LLP

(57) ABSTRACT

The metering servovalve (7) comprises a valve body (8, 30), an open/close element (45) and an electromagnet (15), and is housed in a casing (2) of the injector (1). The electromagnet (15) actuates a mobile armature (16) for a travel defined by a polar surface (19) of the core (18) of the electromagnet (15). This latter is fixed in the casing (2) by means of a threaded ring nut (40), with the interposition of at least one deformable adjustment shim (48). The ring nut (40) is screwed with a pre-set tightening torque on a thread (46) of the casing (2) so as to bring about an elastic deformation of the adjustment shim (48) and to prevent accidental unscrewing of the ring nut (40). The adjustment shim (48) is constituted by a metal ring with a cross section having a shape chosen between L, C, S, Z, and Σ.

8 Claims, 2 Drawing Sheets

ADJUSTABLE METERING SERVOVALVE FOR A FUEL INJECTOR

The present invention relates to an adjustable metering servovalve for the fuel injector of an internal-combustion engine.

As is known, the servovalve of an injector in general comprises a chamber for control of the usual rod for governing the nozzle of the injector. The control chamber is equipped with an inlet hole in communication with a pipe for the fuel under pressure and a calibrated outlet hole or hole for exhaust of the fuel, which is normally closed by an open/close element. Normally the valve body of the servovalve is fixed in a casing of the injector, whilst the open/close element is controlled by the armature of an electromagnet.

The travel or lift of the armature determines the promptness of the response of the servovalve both for opening and for closing, so that it should be as small as possible. Said travel also determines the cross section of passage of the fuel through the exhaust hole, so that it should be as wide as possible within the limits of the section of the outlet hole of the control chamber. Consequently, it is necessary to adjust accurately the travel of the armature and/or of the open/close element. There are known servovalves with the open/close element separate from the armature, the travel of which is defined, on one side, by the arrest against the open/close element in a position of closing of the exhaust hole.

In a known servovalve, the armature is guided by a sleeve, one end of which forms the arrest element for travel of the armature towards the core of the electromagnet. The sleeve is in turn fixed in a cavity of the casing in a position, with respect to the valve body, such as to define the amplitude of the travel of the armature for opening the exhaust hole. The adjustment of the travel of the armature is made by using at least one adjustment shim, which is rigid, i.e., made of a very hard material and is set between the sleeve and the core of the electromagnet in order to define the magnetic gap of the armature. At least one other rigid adjustment shim is set between the sleeve and the valve body to define the travel of the armature. The core is then fixed in the casing by means of a ring nut that is screwed with a torque such as to prevent it from coming loose.

The above servovalve has the drawback of bringing the rigid shim into contact with the polar surface of the core. Since this is made of soft iron, softer than the material of the rigid adjustment shim, it could damage or deform the polar surface of the core.

The aforesaid rigid adjustment shims can be chosen between classes of calibrated and modular adjustment shims. For technological reasons and for economic constraints of feasibility, said adjustment shims can vary from one another by an amount not smaller than the machining tolerances, for example by 5 μm.

In the known servovalves described above, the open/close element is subject, on the one hand, to the axial thrust exerted by the pressure of the fuel in the control chamber and, on the other, to the axial thrust of a spring that is pre-loaded so as to overcome the thrust of the pressure when the electromagnet is not excited. The spring presents then characteristics and overall dimensions such as to be able to exert a considerable axial thrust, for example in the region of 70 N for a pressure of the fuel of 1800 bar. Upon excitation of the electromagnet, the armature is displaced and is arrested against a fixed element, in a position such as to enable a residual minimum magnetic gap with respect to the core of the electromagnet, to optimize the promptness of the servovalve upon de-excitation of the electromagnet.

To reduce the pre-loading of the closing spring of the open/close element a servovalve has recently been proposed, in which the fuel under pressure no longer exerts an axial action, but acts in a radial direction on a support of the open/close element so that the action of the pressure of the fuel on the open/close element is substantially balanced. The action of the spring and that of the electromagnet can hence be of lower value. Furthermore, the travel of actuation of the armature can be arrested directly against the core of the electromagnet, given that the risk of sticking of the armature is negligible, so that the residual magnetic gap with respect to the core itself can be eliminated. Also the travel of the open/close element of this known servovalve is, however, adjusted by means of rigid shims, so that it is possible to obtain discrete variations of said travel in the region of the machining tolerances, i.e., of 5 μm. In the case of a rigid adjustment shim set between the polar surface of the core and a fixed part of the injector, the deformation of the polar surface, in addition to jeopardizing the coaxiality of the open/close element with the respective sealing seat, causes an undesirable variation of the travel of the armature. Furthermore, a plastic deformation of the polar surface of the core would lead to a variation of the state of stress of the threaded coupling between the ring nut for tightening the magnet and the injector body (obtained in the assembly stage by applying a pre-defined tightening torque), with consequent undesirable loosening (for example, due to vibrations, thermal gradients, etc.).

The aim of the invention is to provide an adjustable metering servovalve, which will present high reliability and limited cost, eliminating the drawbacks of servovalves for metering fuel according to the known art.

According to the invention, the above aim is achieved by an adjustable metering servovalve, as defined in Claim 1.

For a better understanding of the invention, two preferred embodiments provided by way of example are described herein with the aid of the annexed plate of drawings, wherein.

Figure 1:
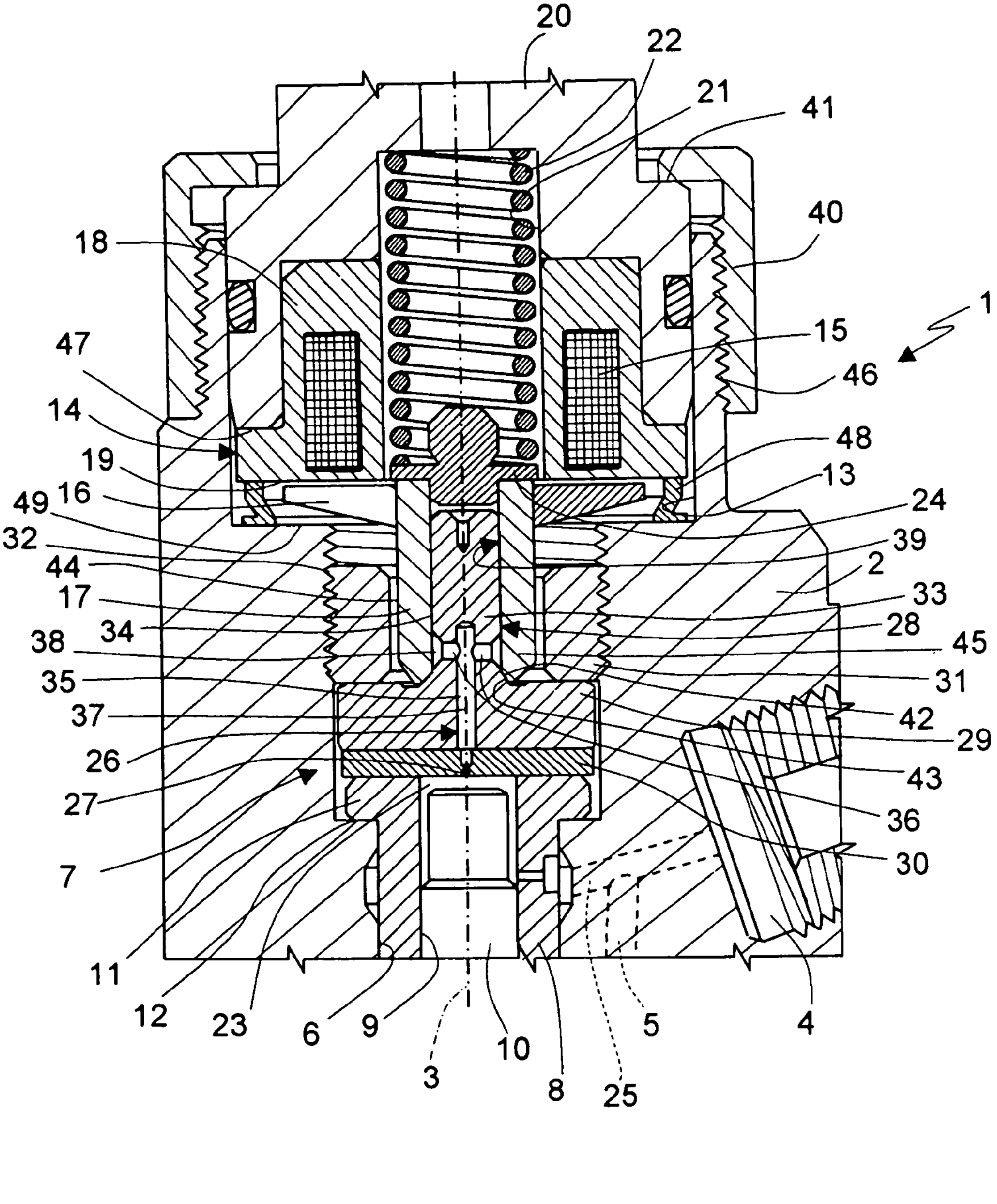
FIG. 1 is a partial cross section of a fuel injector equipped with an adjustable metering servovalve according to a first embodiment of the invention.

With reference to FIG. 1, the reference number 1 designates as a whole a fuel injector (partially illustrated) for an internal-combustion engine, in particular a diesel engine. The injector 1 comprises a hollow body or casing 2, which extends along a longitudinal axis 3 and has a side inlet 4 designed to be connected to a pipe for delivery of the fuel at high pressure, for example at a pressure in the region of 1800 bar. The casing 2 terminates with a nozzle (not illustrated), which communicates with the inlet 4 through a pipe 5 and is designed to inject the fuel in a corresponding cylinder of the engine.

The casing 2 defines an axial cavity 6, in which a metering servovalve 7 comprising a valve body 8 is housed. The body 8 has an axial hole 9, in which a control rod 10 is able to slide axially in a fluid-tight way. The body 8 moreover has a flange 11 normally resting against a shoulder 12 of the cavity 6. The control rod 10 is designed to control in a known way an open/close needle element (not illustrated) for closing and opening the fuel-injection nozzle.

The casing 2 is equipped with another cavity 13, which shares the same axis 3, in which an actuator device 14 is housed, comprising an electromagnet 15 designed to control a notched-disk armature 16, which is made of a single piece with a sleeve 17. The electromagnet 15 is formed by a magnetic core 18, having a polar surface 19 perpendicular to the axis 3. The electromagnet 15 is held in position by a support 20 in a way that will emerge more clearly from what follows.

The magnetic core 18 is equipped with a cavity 21, which also shares the axis 3, in which a helical compression spring 22 is housed, pre-loaded so as to exert an action of thrust on the armature 16 in a direction opposite to the attraction exerted by the electromagnet 15. In particular, the spring 22 has one end resting against the support 20 and the other end acting on the armature 16 through a washer 24, which comprises a block for guiding the end of the spring 22.

The servovalve 7 comprises a control chamber 23, which, through a passage 25, communicates permanently with the inlet 4, to receive the fuel under pressure. The control chamber 23 is delimited axially, on one side, by the rod 10 and, on the other, by a bottom disk 30 in contact with the flange 11 of the body 8. The control chamber 23 also has a passage for outlet or exhaust of the fuel, as a whole designated by 26, which is symmetrical with respect to the axis 3 and comprises an exhaust hole 27 with calibrated section, made in the disk 30 along the axis 3. The outlet passage 26 moreover comprises a distribution stretch 35 made in a body 28 for guiding the armature 16, which is set in an intermediate axial position between the disk 30 and the actuator device 14.

The body 28 comprises a base 29, axially tightened by means of a threaded ring nut 31, which is screwed on an internal thread 32 of the casing 2. In particular, the base 29 of the body 28 is set in a fluid-tight way in the cavity 6, and is pack-tightened in a fixed position with the disk 30 and the flange 11, which is set in axial contrast against the shoulder 12.

Furthermore, the body 28 comprises a pin or stem 33, which extends in cantilever fashion from the base 29 along the axis 3 in a direction opposite to the chamber 23. The pin 33 is delimited externally by a cylindrical side surface 34, designed to guide the sleeve 17 of the armature 16 axially.

The stem 33 is made of a single piece with the base 29 and has two radial holes 36, diametrally opposite to one another in communication with an axial portion 37 of the distribution stretch 35 of the passage 26, so that they are in fluid-tight communication with the calibrated hole 27. The holes 36 give out from the stem 33, in an axial position adjacent to the base 29, in which an annular chamber 38 is made along the side surface 34 of the stem 33 itself. The sleeve 17 has an internal cylindrical surface 39, coupled to the side surface 34 substantially in a fluid-tight way, by means of coupling with calibrated diametral play, for example smaller than 4 μm, or else by interposition of sealing elements.

The sleeve 17 is designed to slide axially along the surface 34 between an advanced end-of-travel position, and a retracted end-of-travel position. The advanced end-of-travel position is such as to close the passage 26 and is defined by a position of arrest, where one end 42 thereof bears upon a conical shoulder 43 of the body 28. The retracted end-of-travel position is such as to open completely the radial holes 36 of the passage 26 and is defined by the arrest of the armature 16 against the polar surface 19 of the core 18.

In particular, in the advanced end-of-travel position, the fuel exerts a zero resultant of axial thrust on the sleeve 17 since the pressure in the chamber 23 acts radially on the surface 34, whilst in the retracted end-of-travel position the fuel flows out of the radial holes 36 towards an exhaust channel or recirculation channel (not illustrated) through an annular passage 44 between the ring nut 31 and the sleeve 17 and through the notches of the armature 16, the cavity 21 of the core 18, and an opening of the support 20.

The annular chamber 38 is designed to be opened and closed by an open/close element 45 defined by a bottom portion of the sleeve 17, adjacent to the end 42. The open/close element 45 is thus actuated together with the armature 16 by excitation of the electromagnet 15. In particular, the armature 16 is displaced towards the core 18 for opening the servovalve 7, thus causing exhaust of the fuel and hence a drop in the pressure of the fuel in the control chamber 23. In this way, an axial translation of the rod 10 is caused, thus governing opening and closing of the injection nozzle. By de-energizing the electromagnet 15, the spring 22 sends the armature 16 back into the position illustrated in FIG. 1, so that the open/close element 45 re-closes the passage 26 and hence the servovalve 7.

In order to determine the travel of the open/close element 45, the core 18 of the electromagnet 15 is fixed in the compartment 13 of the casing 2 by means of a threaded ring nut 40, which engages an annular shoulder 41 of the support 20. The side surface of the support 20 is set in a fluid-tight way in the cavity 13, whilst its bottom end engages an annular shoulder 47 of the core 18.

The ring nut 40 is screwed on an external thread 46 of the casing 2 with a tightening torque such as to guarantee the position desired for the core support 18. This axial position is defined by at least one adjustment shim, constituted by a ring 48 of appropriate thickness, set between the polar surface 19 of the core 18 and a shoulder 49 of the compartment 13 of the casing 2.

According to the invention, the adjustment shim 48 is constituted by an annular element that is designed to undergo flexural or compressive elastic deformation but is of adequate stiffness. The ring nut 40 is designed to be screwed with a tightening torque such as to prevent loosening thereof, for example a torque of approximately 15 Nm. The adjustment shim 48 is such that, with the aforesaid tightening torque, a corresponding axial load of tightening is determined, designed to guarantee an elastic variation of the thickness, or height, in the region of 10 μm.

Figure 2:
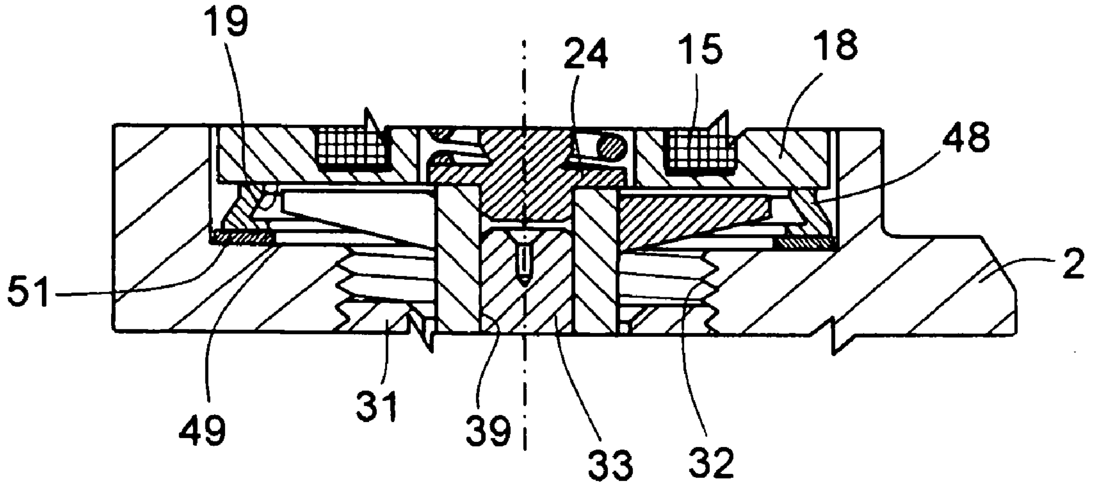
FIG. 2 is a detail of another embodiment of the servovalve, at an enlarged scale.
Figure 3:
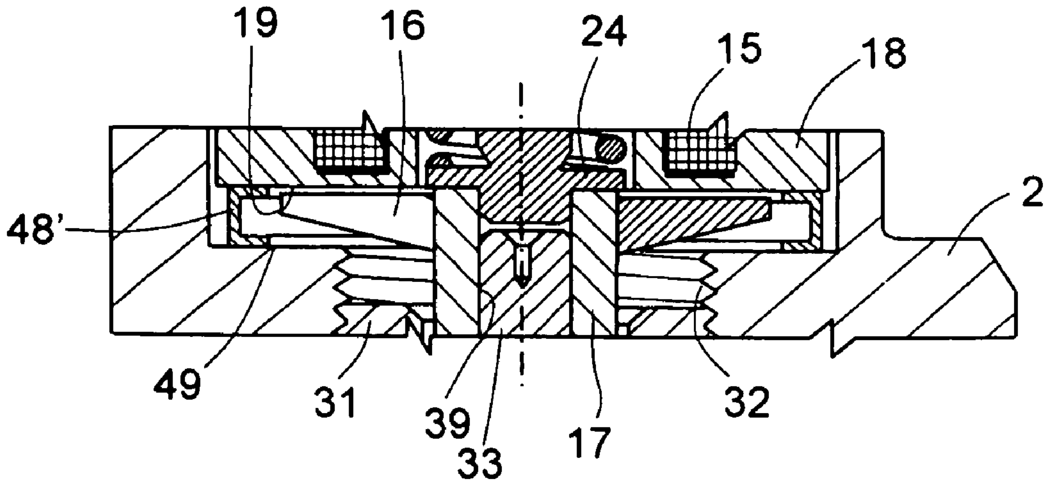
FIG. 3 is a detail of a variant of the servovalve of FIG. 1, also at an enlarged scale.

According to the embodiment of FIG. 2, the adjustment shim 48 is made of metal material and has an L-shaped cross section with at least one portion of the long branch of the L inclined. The adjustment shim 48 is subjected to flexural elastic deformation in the area of joining of the two branches of the L. In this way, the bottom branch of the L remains parallel to the shoulder 49. According to the embodiment of FIG. 3, the adjustment shim 48' has a C-shaped cross section, so that its elastic deformation is brought about substantially by compression of the vertical stretch of the C. Said compression acts on the vertical stretch as end load and also generates a certain flexure between the two horizontal branches of the C.

From a practical standpoint, since the variation of the thickness of the adjustment element is always relatively limited, it could be advisable to provide a store of elastic adjustment shims, of modular dimensions, i.e., divided in classes of thickness. Advantageously, in both of the embodiments of FIGS. 1 and 3, just one adjustment shim 48, 48' can be used, coupling it with one or more rigid adjustment shims 51, as indicated in the variant of FIG. 2 of the embodiment illustrated in FIG. 1. The rigid shims 51 can be calibrated and of modular dimensions and can be chosen so as to reduce to a minimum the deformation of the deformable adjustment shim 48, 48'.

The adjustment of the travel of the open/close element 45 of the servovalve 7, i.e., of the lift of the armature 16, can be made by controlling either a dimensional parameter, for example the distance of the polar surface 19 from the shoulder 49, or an operative parameter, for example by controlling the rate of discharge of the servovalve 7, or else the speed of opening of the servovalve 7 and hence the flow rate of the injector 1.

In particular, during installation of the injector 1, by appropriately choosing the shims 48 and 51, or 48' and 51, a lift of the armature 16 is determined such as to achieve, with the tightening torque envisaged, the desired lift, with a tolerance within the limit of 5 μm. The value of the tightening torque of approximately 15 Nm is such as to guarantee a sufficient friction to prevent loosening of the ring nut 40, on account of the thermal and mechanical stresses caused by the engine. In any case, in order to prevent, with use over time, an even minimal accidental slackening of the ring nut 40, for reasons of safety it is possible to block the ring nut 40 on the casing 2, for example by means of an electrical welding spot.

From the above description, there emerge clearly the advantages of the adjustable metering servovalve according to the invention as compared to the known art. In the first place, it is possible to obtain a sufficiently precise adjustment of the position of the polar surface 19 of the core 18 and hence of the travel of the armature 16. Furthermore, thanks to the deformable shim 48, 48', the risk of plastic deformation of the polar surface 19 by a rigid shim is eliminated. Finally, thanks to the balanced open/close element 45, on the one hand it is possible to use the polar surface 19 directly as arrest for the armature 16, whilst, on the other, the axial load to be generated on the deformable adjustment shim 48, 48' is reduced.

It is understood that various modifications and improvements can be made to the metering servovalve described herein, without departing from the scope of the annexed claims.

For example, the adjustment shim can have a section different from the ones described and illustrated herein, in particular any section that will have a portion that can easily undergo, in a controllable way, elastic deformation, preferably prevalently flexural deformation, for example an S-shaped cross section, Z-shaped cross section or Σ-shaped cross section. Furthermore, the bottom disk 30 of the valve body 8 can also be made of a single piece with the latter. In turn, the armature 16 can be equipped with a thin layer of non-magnetic material, which will function as magnetic gap.

The invention claimed is:

1. A metering servovalve for the fuel injector of an internal-combustion engine, comprising a valve body and an open/close element controlled by an armature of an electromagnet, said servovalve being housed in a cavity of a casing of said injector; said electromagnet comprising a magnetic core fixed in said cavity by means of a threaded element; said armature being designed to perform a given travel defined by a pair of opposed arrest elements, and said threaded element being screwed on a thread of said casing with a pre-set tightening torque such as to prevent any accidental loosening of said threaded element; an adjustment shim being set between said magnetic core and a shoulder of said cavity; wherein said adjustment shim is positioned in contact with said magnetic core whereby the pre-set tightening torque of the threaded element on the thread of the casing causes a compression between the magnetic core and the adjustment shims with the adjustment shim being formed of a material softer than that of said magnetic core to prevent any plastic deformation of the magnetic core by the axial load produced by said pre-set tightening torque, the material of said adjustment shim being such that said axial load guarantees a predetermined elastic deformation of said adjustment shim that is configured to prevalently undergo flexure deformation but still provides adequate stiffness to maintain the height of the shim.

2. The servovalve according to claim 1, wherein one of said opposite arrests comprises a polar surface of said magnetic core.

3. The servovalve according to claim 1, wherein, said adjustment shim comprises a ring having a cross section.

4. The servovalve according to claim 3, wherein said ring has a cross section selected from the group consisting of an L-shaped cross section, a C-shaped cross section, an S-shaped cross section, a Z-shaped cross section, and a 3-shaped cross section.

5. The servovalve according to claim 1, wherein at least one further adjustment shim made of rigid material and having modular dimensions is set between said adjustment shim and said shoulder.

6. The servovalve according to claim 1, comprising a control chamber in communication with an exhaust passage, wherein said open/close element is formed by a sleeve fixed to said armature, said sleeve being configured to slide on a stem, which carries at least one radial hole of said exhaust passage, said radial hole being designed to be closed by said sleeve when said electromagnet is de-energized.

7. The servovalve according to claim 1, in which said pre-set tightening torque is in the region of 15 Nm, said elastic deformation being an elastic variation of the height of said shim in the region of 10 μm.

8. A metering servovalve for the fuel injector of an internal-combustion engine, comprising: a valve body and an open/close element controlled by an armature of an electromagnet, said servovalve being housed in a cavity of a casing of said injector; said servovalve comprising:

a magnetic core provided with an annular shoulder, a support for said magnetic core having a bottom edge engaging said annular shoulder of the magnetic core, said support being provided with another annular shoulder engaged by a threaded ring nut screwed on an external thread of said casing to fix said support and said magnetic core in said cavity;

said armature being designed to perform a given travel defined by a pair of opposed arrest elements, and said threaded ring nut being screwed on said external thread of said casing with a pre-set tightening torque adapted to prevent any accidental loosening of said threaded ring nut; an adjustment ring shim being set between said magnetic core and a shoulder of said cavity; wherein said adjustment ring shim is positioned in contact with said magnetic core and has a cross section configured to prevalently undergo flexure deformation caused by the axial load produced by the pre-set tightening torque of the threaded ring nut on the thread of the casing with a compression between the magnetic core and the adjustment ring shim, said adjustment ring shim being formed of a material softer than that of said magnetic core to prevent any plastic deformation of the magnetic core by the axial load produced by said pre-set tightening torque, the material of said adjustment ring shim being such that said axial load guarantees a predetermined elastic deformation of a height of said adjustment ring shim.

* * * * *